United States Patent
Reinhold

(10) Patent No.: US 7,802,240 B2
(45) Date of Patent: Sep. 21, 2010

(54) MECHANISM FOR COMPILING PROGRAMS

(75) Inventor: Mark B. Reinhold, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1122 days.

(21) Appl. No.: 11/475,703

(22) Filed: Jun. 26, 2006

(65) Prior Publication Data

US 2007/0300211 A1    Dec. 27, 2007

(51) Int. Cl.
*G06F 9/45* (2006.01)

(52) U.S. Cl. ............... 717/140; 717/131; 717/137; 717/141; 717/143

(58) Field of Classification Search ......... 717/106–119, 717/136–161
See application file for complete search history.

(56) References Cited

U.S. PATENT DOCUMENTS

| | | | | |
|---|---|---|---|---|
| 5,742,828 A | * | 4/1998 | Canady et al. | 717/144 |
| 6,092,036 A | * | 7/2000 | Hamann | 704/8 |
| 6,754,884 B1 | * | 6/2004 | Lucas et al. | 717/108 |
| 2004/0216086 A1 | * | 10/2004 | Bau | 717/114 |
| 2006/0282820 A1 | * | 12/2006 | Lee | 717/114 |

OTHER PUBLICATIONS

Ed Ort and Bhakti Mehta; Java Architecture for XML Binding (JAXB); http://java.sun.com/developer/technicalArticles/WebServices/jaxb/; Mar. 2003; pp. 1-10.*
ECMAScript for XML (E4X) Specification, ECMA International, Standard ECMA-357, 2$^{nd}$ Edition, Dec. 2005, Geneva, 109 pgs.

* cited by examiner

*Primary Examiner*—Wei Y Zhen
*Assistant Examiner*—Satish Rampuria
(74) *Attorney, Agent, or Firm*—Osha • Liang LLP

(57) ABSTRACT

A mechanism is disclosed for compiling a program which is written in a first language having a first syntax. An indication is detected, in a set of code within the program, that the set of code contains a non-compliant identifier that is not intended to be compliant with the first syntax associated with the first language. In response to detecting the indication, the non-compliant identifier is transformed into a transformed identifier that is compliant with a second syntax associated with a second language. Compiled code that uses and operates with the transformed identifier is emitted. For example, the first program may be written in language that is substantially similar to the Java programming language. The first syntax may be a syntax that is substantially compliant with syntax of the Java programming language. The second language may be XML, wherein the second syntax is substantially compliant with XML.

12 Claims, 4 Drawing Sheets

200

---

202

Detect an indication that a set of code contains an identifier that is not intended to be compliant with a first syntax associated with a first language

---

204

Transform the identifier into a transformed identifier that is compliant with a second syntax associated with a second language

---

206

Emit compiled code that uses and operates with the transformed identifier

Fig. 2

MECHANISM FOR COMPILING PROGRAMS

BACKGROUND

A programming language is used to write source code that contains instructions that can be compiled and then executed by a computer. The source code usually contains identifiers, which refer to user-defined entities such as variables, methods, functions, classes, etc. Every programming language has a syntax that defines rules for forming identifiers. The syntax specifies a set of characters that can be used to form the identifiers. This set of characters may be referred to as "legal identifier characters." Programming languages typically have reserved words, such as "function" or "class." The syntax typically also specifies that reserved words cannot be used in identifiers.

A markup language is a set of words and symbols for describing the information that is contained in a document. An example of a markup language is the Extensible Markup Language (XML). Markup languages also have syntax for forming identifiers. For example, each markup language has a set of characters that can be used to form identifiers. As a particular example, the Extensible Markup Language (XML) defines a specific set of characters that can be used to form identifiers that can be used in documents as names of user-defined elements and attributes. Thus, XML has a set of legal identifier characters.

The syntax for forming identifiers in XML is different from at least some other languages. For example, the legal identifier characters in the XML syntax are different from at least some other languages, such as the JAVA™ programming language. As a particular example, the XML syntax allows the punctuation character "-" to be used in an identifier. However, the JAVA programming language does not allow a "-" character to be used an identifier. Rather, that character is reserved for use as a minus sign in an expression.

The different syntaxes that languages have for forming identifiers can sometimes present problems. For example, it may be desirable to allow an existing programming language to work with (e.g., create and modify) Extensible Markup Language (XML) documents. This may require a program that is not written in XML ("non-XML program") to reference an XML identifier. If the of XML and the syntax of the non-XML language are incompatible, then it may not be possible for the program written in the non-XML language to reference the XML identifier.

To allow a non-XML language to work with XML documents, a set of library APIs can be defined for creating and manipulating data structures that represent XML documents. The non-XML program uses these APIs in order to create and manipulate data structures that represent XML documents. In this API technique, XML identifiers are represented as strings in the non-XML program. A drawback with this approach is that a more intimate connection between the two languages is desired.

Another technique for allowing an existing programming language to work with XML documents is the E4X standard. The E4X standard (ECMA-357) defines an embedding of XML into the ECMAScript programming language. In this embedding, if the XML identifier happens to be a legal ECMAScript identifier, the XML identifier can be written as-is, without any special notation. However, if the XML identifier is not a legal ECMAScript identifier, then it must be written as an ordinary string constant and surrounded by square brackets. For example, the XML identifier "foo-bar" would be written as follows, where "ns" is a variable representing the identifier's namespace.

ns: ["foo-bar"]

The E4X approach has several drawbacks. One drawback is the complexity of the syntax required to represent XML identifiers that are not legal ECMAScript identifiers. Another drawback with the E4X approach is that it may not be clear to the programmer whether the identifier is intended as an XML identifier or a regular program identifier. The E4X approach does define rules for the compiler to interpret the identifier as either an XML identifier or a regular program identifier. However, because no special notation is used for the XML identifier when it is also a legal ECMAScript identifier, it is not readily apparent to the programmer by examining the identifier itself whether it is intended to be an XML identifier or an ECMAScript identifier.

Because of these and potentially other drawbacks, these approaches do not provide wholly satisfactory results. Consequently, an improved mechanism for allowing programs that use different legal identifier characters to work together is desired. Furthermore, an improved mechanism for allowing programs written in languages other than XML to work with XML documents is desired.

SUMMARY

In accordance with one embodiment of the present invention, there is provided a mechanism for compiling a program which is written in a first language having a first syntax associated therewith. In one embodiment, an indication is detected, in a set of code within the program, that the set of code contains an identifier ("non-compliant identifier") that is not intended to be compliant with the first syntax associated with the first language. Throughout this description, the term "non-compliant identifier" means an identifier that is not intended to be compliant with a syntax associated with a language. In response to detecting the indication, the non-compliant identifier is transformed into a transformed identifier that is compliant with a second syntax associated with a second language. Compiled code that uses and operates with the transformed identifier is emitted, in accordance with an embodiment.

For example, the first program ("JAVA program") may be written in language that is substantially similar to the JAVA programming language. Thus, the first syntax may be a syntax that is substantially compliant with syntax of the JAVA programming language. The second language may be XML. Thus, the second syntax may be a syntax that is substantially compliant with syntax of the XML language. The JAVA program has embedded in it an identifier that is not intended to be compliant with the syntax of the JAVA programming language. Rather, the non-compliant identifier is intended to refer to an identifier associated with an XML document. Upon detecting the non-compliant identifier, a compiler transforms the non-compliant identifier into a transformed identifier that is compliant with the syntax associated with XML.

In addition to detecting and transforming the non-compliant identifier, as previously described, the following additional steps are performed in accordance with an embodiment. An introduction character in the set of code is detected. The introduction character precedes the non-compliant identifier and is a character that is not a legal identifier character in the first syntax associated with the first language. The introduction character is also not a legal identifier character in the second syntax associated with the second language, in accordance with one embodiment.

Transforming the non-compliant identifier includes the following, in accordance with one embodiment. A character of the non-compliant identifier is selected. A determination is made as to whether the selected character is a legal character in the first syntax associated with the first language. In response to a determination that the selected character is a legal identifier character in the first syntax, the selected character is represented in the transformed identifier. For example, the selected character is included in a string of identifier characters. In response to a determination that the selected character is not a legal identifier character in the first syntax, a determination is made as to whether the selected character is an escape character. In response to a determination that the selected character is an escape character, a next character of the non-compliant identifier is selected and represented in the transformed identifier. If there are more characters in the non-compliant identifier, the process repeats until all characters of the non-compliant identifier have been selected.

Compiling a program which is written in a first language having a first syntax associated therewith in the above manner allows for a very compact representation of an identifier that is not intended to be compliant with the first syntax associated with the first language. Further, both the compiler and programmers can unambiguously distinguish the non-compliant identifier from other program identifiers in the first programming language.

BRIEF DESCRIPTION OF THE DRAWINGS

FIG. 2 is a flowchart illustrating steps of a process of compiling a program which is written in a first language having a first syntax associated therewith, in accordance with an embodiment of the present invention.

DETAILED DESCRIPTION OF EMBODIMENT(S)

System Overview

Figure 1:
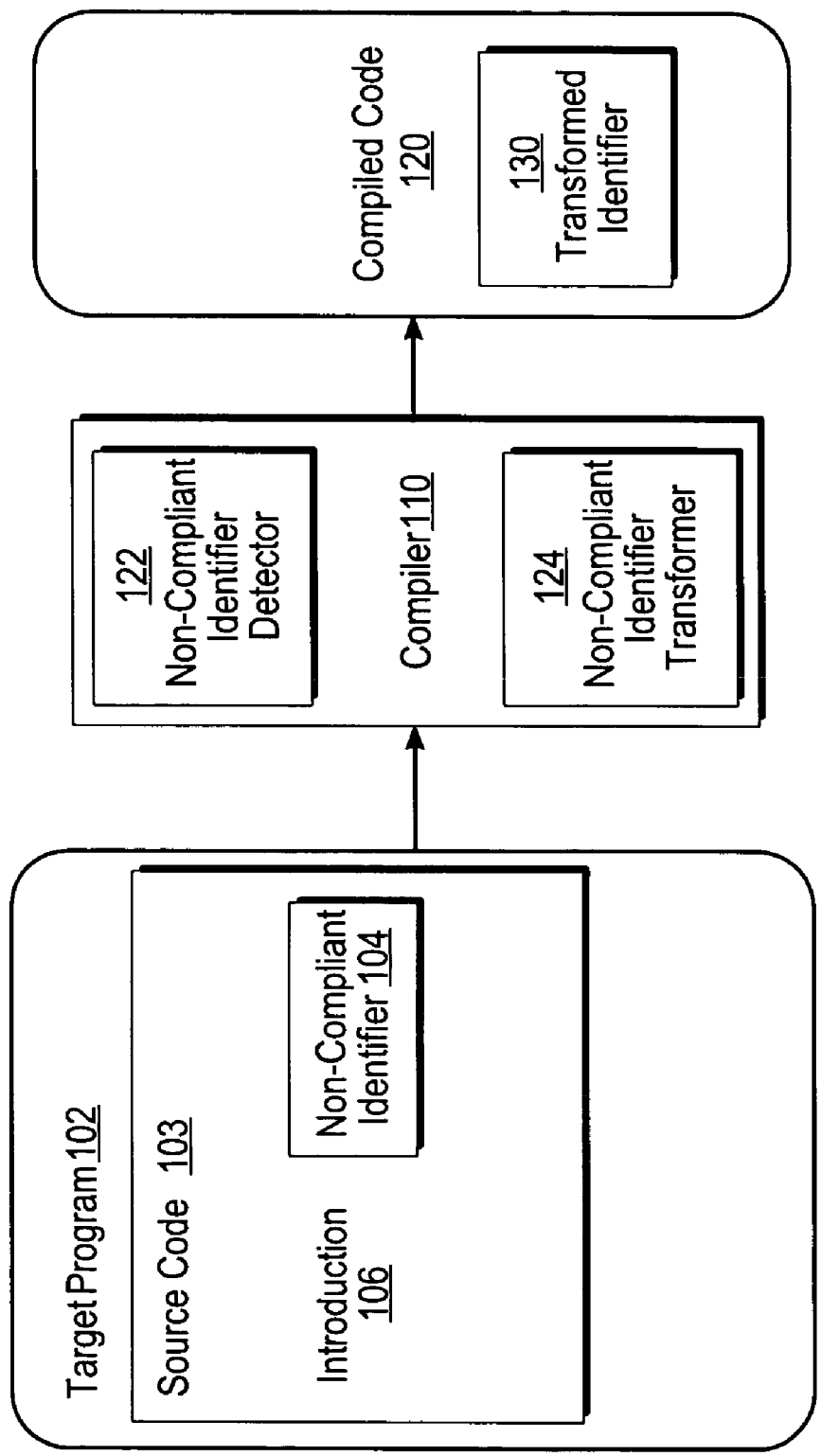
FIG. 1 is a diagram of a compiler for transforming a non-compliant identifier in a target program, in accordance with an embodiment of the present invention.

With reference to FIG. 1, there is shown a compiler 110 that compiles source code 103 having embedded therein an identifier that is not intended to be compliant with syntax of the programming language of the target program 102, in accordance with an embodiment of the present invention. The source code 103 of target program 102 is written in a target programming language with a particular syntax. The target programming language may be a computer programming language such as the JAVA programming language, the C programming language, etc. The source code 103 has embedded therein an identifier (non-compliant identifier 104) that is not intended to be compliant with the syntax associated with the target language. The source code 103 also has embedded therein an introduction 106, which introduces the non-compliant identifier 104, in accordance with an embodiment.

The compiler 110 has a non-compliant identifier detector 122 which is able to detect that the source code 103 has a non-compliant identifier 104 embedded therein. For example, in order to detect the non-compliant identifier 104, the non-compliant identifier detector 122 detects the introduction 106 in the source code 103. The compiler 110 has a non-compliant identifier transformer 124 that is able to transform the non-compliant identifier 104 into a transformed identifier 130. The non-compliant identifier transformer 124 and the non-compliant identifier detector 122 are instructions that are executed on a processor, in one embodiment. The compiled code 120 uses and operates with the transformed identifier 130.

Example Embodiment

The following example is used to illustrate principles of compiling a target program having embedded therein an identifier ("non-compliant identifier") that is not intended to be compliant with syntax of the target programming language, in accordance with an embodiment of the present invention. After transforming the non-compliant identifier, it is compliant with the syntax of another language. Two characters that are not legal for use in forming identifiers in either the target or the other language are used in forming non-compliant identifiers, in this embodiment. One of the characters is used to introduce the non-compliant identifier. For example, this character is used for the introduction 106 in FIG. 1. The other character is used as an escape character and is written before any character in the non-compliant identifier that is not a legal identifier character in the target programming language. The following is an example of a general form for the non-compliant identifier (with introduction character) in accordance with an embodiment of the present invention, described as a regular expression:

Intro (p1-character|(esc identifier-character))+

The "+" in the above general form means that the immediately-preceding parenthesized construct is to be matched against a candidate non-compliant identifier at least one time and possibly many times. In other words, a non-compliant identifier consists of an introduction character (intro) followed by one or more additional characters. Each additional character may be either a character in the target language (p1-character) or an instance of the escape character (esc) followed immediately by a character in the other language (identifier-character).

Table I provides examples of non-compliant identifiers, along with associated transformed identifiers. In the examples in Table I, the introduction character is the "#" and the escape character is the "\". However, other characters could be used.

TABLE I

| Non-compliant Identifier | Transformed Identifier |
|---|---|
| #foo | foo |
| #fooBar | fooBar |
| #foo_bar | foo_bar |
| #foo\-bar | foo-bar |
| #foo\.bar | foo.bar |
| #document\.class | document.class |
| #document\.wait | document.wait |
| #document\.toString | document.toString |

After the introduction character, the non-compliant identifier may contain identifier characters that are legal for use in forming identifiers in the target programming language ("legal character identifier") and the other language. The p1-character in the above general form represents a character that is a legal character identifier in both the target programming language and the other language. When the compiler encounters a p1-character, the compiler represents that character in the transformed identifier. For example, in the first example in Table I, there are three p1-characters, ("f" "o" "o"). In this example, the compiler generates the string "foo" to represent the transformed identifier, in one embodiment. However, the compiler can represent the characters in the transformed identifier by other than a string of characters.

The non-compliant identifier may contain characters that are not legal character identifiers in the target programming language, but that are legal identifier characters in the other language. For example, characters such as "-" and "." are not legal character identifiers in the JAVA programming language. However, these are legal characters for forming identifiers in the XML language. Referring again to the general form, the escape character is written prior to such characters that are not legal identifier characters in the target programming language, but are legal in the other language. For example, in Table 1, the escape character "\" is included in the non-compliant identifier prior to the "-" and "." characters. When the compiler encounters the escape character in the non-compliant identifier, the compiler selects the character that follows the escape character and represents that character in the transformed identifier. For example, the characters "-" and "." are included in the transformed identifiers "foo-bar" and "foo.bar".

Alleviating Ambiguities

The example format for the non-compliant identifier described herein alleviates ambiguities that may otherwise arise when embedding identifiers from one language into a program written in another language. The following example of embedding an XML identifier into a JAVA program is used to illustrate how the example format can alleviate ambiguities. However, the example format alleviates ambiguities when co-mingling identifier characters of other languages.

In the syntax of the XML language, the following expression is a legal identifier:
document.class In the syntax of the JAVA programming language, however, the above expression is not a legal identifier. Rather, it is an expression denoting the class of the object referred to by the variable named "document". In the JAVA programming language, "class" is a reserved word and cannot have any other meaning.

In order to avoid this ambiguity, the XML identifier "document.class" is embedded into a JAVA program by the following non-compliant identifier, in one embodiment:
document\.class The compiler 110 transforms the above non-compliant identifier "#document\.class" into "document.class" such that it is compliant with XML syntax. If it is desired to compute the class of the "document" object in the JAVA program, then the following is used in the JAVA program, without any ambiguity as to meaning:
document.class Thus, this embodiment alleviates ambiguities that may otherwise arise when embedding an XML identifier into program having syntax other than XML.

Process Overview

FIG. 2 is a flowchart illustrating steps of a process 200 of compiling a program which is written in a first language having a first syntax associated therewith, in accordance with an embodiment of the present invention. The program has a set of code, which may be source code that is compliant with the syntax associated with the first language. Embedded in the code is an identifier ("non-compliant identifier") that is not intended to be compliant with the syntax of the first language. The process 200 identifies the non-compliant identifier and transforms it into a format that is compliant with the syntax of a second language.

To illustrate, the first program may be written in the JAVA programming language and the non-compliant identifier may be:
foo\.bar The second language may be XML. However process 200 is limited to neither the JAVA programming language nor XML.

In step 202, an indication that the set of code contains an identifier (noncompliant identifier) that is not intended to be compliant with a first syntax associated with a first language is detected. Detecting the indication comprises detecting an introduction character in the set of code, in accordance with one embodiment. The introduction character precedes the non-compliant identifier and is a character that is not a legal identifier character in the first syntax associated with the first language, in accordance with one embodiment. In the present example, the "#" character indicates that the JAVA code contains an identifier that is not intended to be compliant with the JAVA syntax. The introduction character is not a legal identifier character in the second syntax associated with the second language, in accordance with one embodiment. For example, the "#" character is not a legal identifier character in the syntax of JAVA.

In step 204, the non-compliant identifier is transformed into a transformed identifier that is compliant with a second syntax associated with a second language, in response to detection of the indication. Continuing with the present example in which XML is the second language, the non-compliant identifier "#foo\.bar" is transformed into "foo.bar", which is compliant with the syntax of XML. Process 200 of FIG. 2 depicts details of transforming non-compliant identifiers, in accordance with one embodiment of the present invention.

In step 206, compiled code is emitted that uses and operates with the transformed identifier. Using the present example, the compiled JAVA code is able to use and operate with an identifier of a portion of an XML document. For example, the compiled JAVA code is able to create and manipulate an XML document by using and operating with the transformed identifier. The compiled code that is emitted is JAVA byte code, in one embodiment. To use and operate with the transformed identifier, the JAVA byte code may be interpreted or compiled on a JAVA virtual machine.

Transforming the Non-Compliant Identifier

Figure 3:
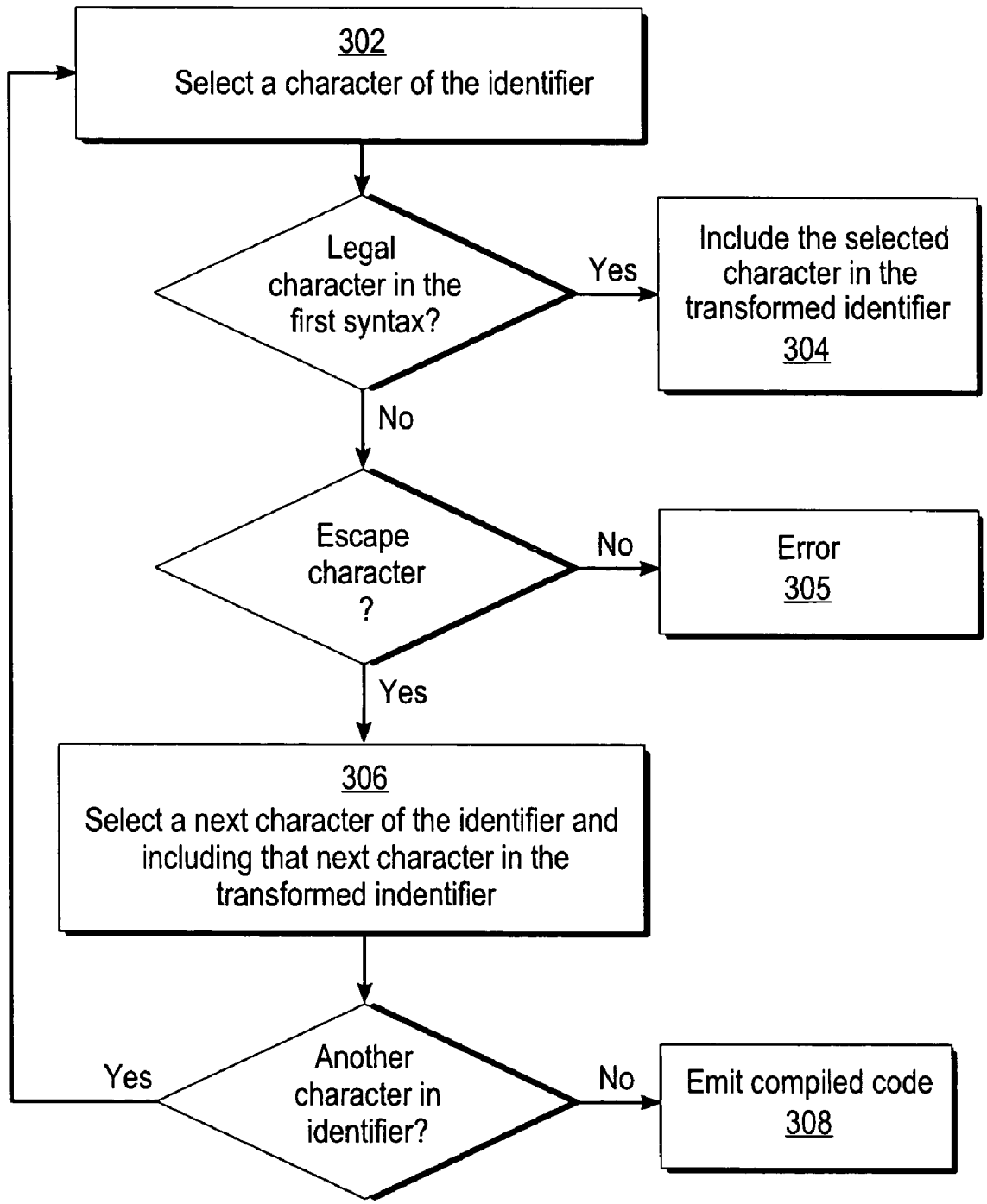
FIG. 3 is a flowchart illustrating steps of a process of transforming a non-compliant identifier embedded in a program, in accordance with an embodiment of the present invention.

FIG. 3 is a flowchart illustrating steps of a process 300 of transforming a non-compliant identifier embedded in a program having a first syntax, in accordance with an embodiment of the present invention. The non-compliant identifier is transformed such that it is compliant with a second syntax. Process 300 may be initiated in response to determining that there is a non-compliant identifier in source code of a target program. A compiler performs steps of process 300, in accordance with one embodiment.

In step 302, a character of the non-compliant identifier is selected. If the character is a legal character identifier in the first syntax, then the character is represented in the transformed identifier in step 304. For example, continuing with the example in which the non-compliant identifier is "#foo\.bar", if the selected character is "f", the "f" is represented in the transformed identifier. For example, the character "f" is added to a string, in one embodiment.

If the character is not a legal character identifier in the first syntax, then a determination is made as to whether the character is an escape character. If the character is an escape character, then a next character of the non-compliant identifier is selected and represented in the transformed identifier, in step 306. Continuing with the example, when the compiler encounters the "\" character in the non-compliant identifier, the compiler selects the "." character that follows and represents the "." in the transformed identifier.

If the character that is not a legal character identifier in the first syntax is not an escape character, then an error may be raised, in step 305. In other words, the compiler has a set of rules for what constitutes a legal non-compliant identifier. An error is raised if the non-compliant identifier violates one of these rules.

If there are more characters in the non-compliant identifier, control returns to step 302 to examine another character in the non-compliant identifier. When all characters in the non-compliant identifier have been examined, control passes to step 308 to emit compiled code that uses and operates with the transformed identifier.

Therefore it is seen that a mechanism is provided for compiling a program which is written in a first language having a first syntax, wherein the program has an identifier embedded therein that is not intended to be compliant with the first syntax associated with the first language. Further, a mechanism is provided for compiling a program having an XML identifier embedded in the source code of the program, wherein the syntax of the programming language of the source code is other than XML. Thus, XML identifiers can be embedded in programs written in other languages, such as the JAVA programming language.

Hardware Overview

Figure 4:
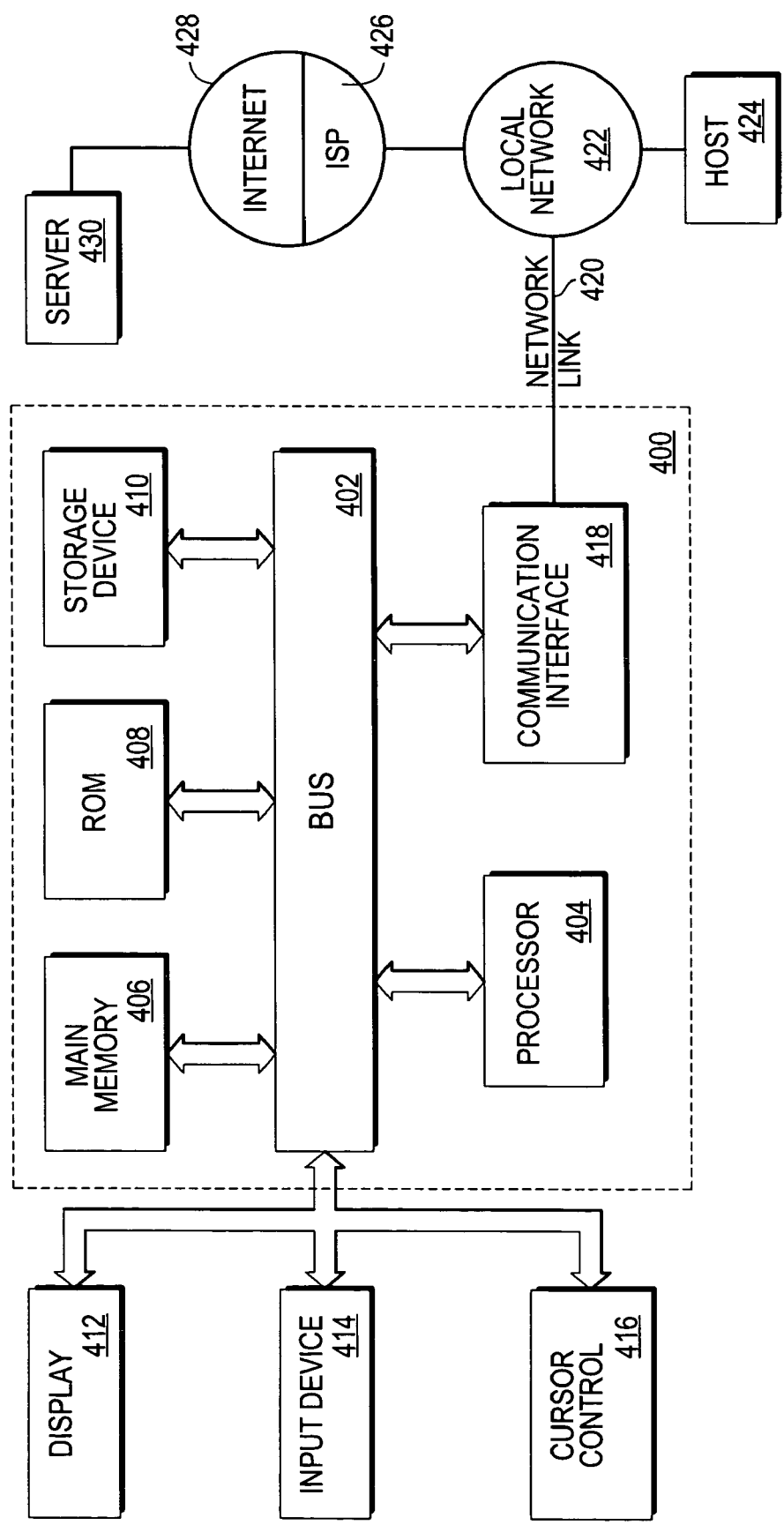
FIG. 4 is a block diagram of a general purpose computer system in which one embodiment of the present invention may be implemented.

The compiler 110 of FIG. 1 may take the form of sets of instructions that are executed by one or more processors, in one embodiment. In one embodiment, steps of process 200 may take the form of sets of instructions that are executed by one or more processors. In one embodiment, steps of process 300 may take the form of sets of instructions that are executed by one or more processors. If the compiler and/or these processes take the form of sets of instructions, FIG. 4 shows a block diagram of a computer system 400 upon which these sets of instructions may be executed. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CDROM, DVD, or any other optical storage medium, punchcards, papertape, any other physical medium with patterns of holes, a RAM, a PROM, and EPROM, a FLASH-EPROM, any other memory chip or cartridge, or any other physical medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method for compiling a program which is written in a first language having a first syntax associated therewith, the method comprising steps performed by a processor, the steps comprising:

detecting, in a set of code within the program, an indication that the set of code contains a non-compliant identifier that is not intended to be compliant with the first syntax associated with the first language, wherein detecting an indication comprises detecting an introduction character in the set of code, wherein the introduction character precedes the non-compliant identifier and is a character that is not a legal identifier character in the first syntax associated with the first language, and wherein the non-compliant identifier is composed of one or more characters; and in response to detection of the indication, transforming the non-compliant identifier into a transformed identifier that is compliant with a second syntax associated with a second language, wherein transforming the non-compliant identifier comprises:

(a) selecting a character of the non-compliant identifier;
   (b) determining whether the selected character is a legal identifier character in the first syntax associated with the first language;
   (c) in response to a determination that the selected character is a legal identifier character in the first syntax, representing the selected character in the transformed identifier;
   (d) in response to a determination that the selected character is not a legal identifier character in the first syntax, determining whether the selected character is an escape character;
   (e) in response to a determination that the selected character is an escape character, selecting a next character of the non-compliant identifier, and representing that next character in the transformed identifier;
   (f) selecting another character of the non-compliant identifier, if there is a character of the non-compliant identifier that has not been selected; and
   (g) repeating b-f until all characters of the non-compliant identifier have been selected.

2. The method of claim 1, the steps further comprising: emitting compiled code that uses and operates with the transformed identifier.

3. The method of claim 1, wherein representing the selected character in the transformed identifier comprises including the selected character in the transformed identifier; and wherein representing that next character in the transformed identifier comprises including that next character in the transformed identifier.

4. The method of claim 1, wherein the introduction character is a character that is not a legal identifier character in the second syntax associated with the second language.

5. The method of claim 1, wherein the second syntax is substantially compliant with syntax of Extensible Markup Language (XML).

6. The method of claim 1, wherein the transformed identifier comprises a word that is reserved in the first syntax.

7. A non-transitory machine readable physical medium comprising:

instructions for causing one or more processors to detect, in a set of code within the program, an indication that the set of code contains a non-compliant identifier that is not intended to be compliant with the first syntax associated with the first language, wherein the instructions for causing one or more processors to detect an indication comprise instructions for causing one or more processors to detecting an introduction character in the set of code, wherein the introduction character precedes the non-compliant identifier and is a character that is not a legal identifier character in the first syntax associated with the first language, and wherein the non-compliant identifier is composed of one or more characters; and instructions for causing one or more processors to transform, in response to detection of the indication, the non-compliant identifier into a transformed identifier that is compliant with a second syntax associated with a second language, wherein the instructions for causing one or more processors to transform the non-compliant identifier comprises instructions for causing one or more processors to:

(a) select a character of the non-compliant identifier;
(b) determine whether the selected character is a legal identifier character in the first syntax associated with the first language;
(c) in response to a determination that the selected character is a legal identifier character in the first syntax, represent the selected character in the transformed identifier;
(d) in response to a determination that the selected character is not a legal identifier character in the first syntax, determine whether the selected character is an escape character;
(e) in response to a determination that the selected character is an escape character, select a next character of the non-compliant identifier, and represent that next character in the transformed identifier;
(f) select another character of the non-compliant identifier, if there is a character of the non-compliant identifier that has not been selected; and
(g) repeat b-f until all characters of the non-compliant identifier have been selected.

8. The machine readable medium of claim 7, further comprising:

instructions for causing one or more processors to emit compiled code that uses and operates with the transformed identifier.

9. The machine readable medium of claim 7, wherein the instructions for causing one or more processors to represent the selected character in the transformed identifier comprise instructions for causing one or more processors to include the selected character in the transformed identifier; and wherein the instructions for causing one or more processors to represent that next character in the transformed identifier comprise instructions for causing one or more processors to include that next character in the transformed identifier.

10. The machine readable medium of claim 7, wherein the introduction character is a character that is not a legal identifier character in the second syntax associated with the second language.

11. The machine readable medium of claim 7, wherein the second syntax is substantially compliant with syntax of Extensible Markup Language (XML).

12. The machine readable medium of claim 7, wherein the transformed identifier comprises a word that is reserved in the first syntax.

* * * * *